United States Patent
Langley (10) Patent No.: US 9,821,886 B2
(45) Date of Patent: *Nov. 21, 2017

(54) BOAT COVER WITH AN INTERIOR STRAP STRUCTURE

(71) Applicant: Cabela's Incorporated, Sidney, NE (US)

(72) Inventor: Christopher Langley, Sidney, NE (US)

(73) Assignee: Cabela's Incorporated, Sidney, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/202,291

(22) Filed: Jul. 5, 2016

(65) Prior Publication Data

US 2016/0311504 A1  Oct. 27, 2016

Related U.S. Application Data

(63) Continuation of application No. 14/572,337, filed on Dec. 16, 2014, now Pat. No. 9,409,629.

(60) Provisional application No. 61/917,637, filed on Dec. 18, 2013.

(51) Int. Cl.
| | |
|---|---|
| *B63B 17/02* | (2006.01) |
| *B60P 3/10* | (2006.01) |
| *B60P 7/08* | (2006.01) |

(52) U.S. Cl.
CPC ............ *B63B 17/02* (2013.01); *B60P 3/1041* (2013.01); *B60P 7/0876* (2013.01)

(58) Field of Classification Search
CPC .. B63B 7/00; B63B 7/08; B63B 7/085; B63B 17/00; B63B 17/02

USPC ......................................................... 114/361
See application file for complete search history.

(56) References Cited

U.S. PATENT DOCUMENTS

| | | | |
|---|---|---|---|
| 5,228,408 A | 7/1993 | Jannausch | |
| 5,632,223 A | 5/1997 | Bray et al. | |
| 5,816,185 A * | 10/1998 | Ruthrford | B63B 17/02 114/361 |
| 6,623,322 B1 | 9/2003 | Lesniak | |
| 9,409,629 B2 * | 8/2016 | Langley | B63B 17/02 |
| 9,718,517 B2 * | 8/2017 | Zirkelbach | B63B 17/02 |
| 2015/0210150 A1 | 7/2015 | Alexander | |

OTHER PUBLICATIONS

Jamestown Distributors product page for Taylor Made SST Self Supporting Boat Covers from jamestowndistributors.com website [online] [retrieved on Apr. 1, 2015], 1 page. Retrieved from <URL: http://www.jamestowndistributors.com/userportal/show_product.do?pid=6566>.

* cited by examiner

*Primary Examiner* — Lars A Olson
(74) *Attorney, Agent, or Firm* — Quarles & Brady LLP (57) ABSTRACT

An improved boat cover for covering a boat having a strap configuration that helps to better shed precipitation. The cover may have a fabric having a top side that is adapted to shed precipitation and a bottom side that, when the boat cover is in an attached state to the boat, at least a portion of the bottom side faces a portion interior of the boat. One or more longitudinal straps and one or more lateral straps may support the fabric on its bottom side. In the attached state the straps support the fabric such that a semi-rigid rib structure beneath the boat cover is formed to pull the boat cover taut over the boat.

17 Claims, 7 Drawing Sheets

BOAT COVER WITH AN INTERIOR STRAP STRUCTURE

CROSS-REFERENCE TO RELATED APPLICATION

This application is a continuation of U.S. patent application Ser. No. 14/572,337 entitled "BOAT COVER WITH AN INTERIOR STRAP STRUCTURE" and filed on Dec. 16, 2014, which claims priority to U.S. Provisional Patent Application 61/917,637, filed on Dec. 18, 2013.

BACKGROUND

This disclosure relates to a cover for a boat such as a cover that is used during storage or transportation of a boat.

When a boat is not in use, it is often conventional to place a boat cover over the top of the boat. Such covers are often made of a fabric material, for example polyester or nylon, which helps to protect the boat from exposure to the surrounding environment. Such a cover can help to shed precipitation such as water or snow from entering an interior of the boat as well as help protect the interior of the boat from other particles such as road debris, which may be a particular concern if the boat is being towed. A cover can also help to keep any loose items stored inside the boat in the boat interior during towing whereas, without a cover applied, the interior of the boat would be exposed to some amount of air currents and wind resistance, which may decrease the effectiveness of the boat cover.

To apply the cover to the boat, the boat is usually placed on the trailer and the fabric of the cover is placed over the boat. In some instances, the cover may be custom, or form fitted, and designed for the specific shape of the boat. However, in some universal covers, the fabric may only have a shape generally resembling, and not specifically matching, the shape of the boat. In any event, once the fabric is placed over the boat, the cover is then secured in place, such as with tie downs (e.g., straps or bungee cords), draw strings, or other such securing elements.

Conventional boat covers typically have securing means on the top side or periphery of the cover that focus primarily on preventing the cover from blowing off the top of the boat (as detachment of the cover from the boat is one of the biggest concerns when a boat is being towed). One problem with the traditional method of securing the cover to the boat is that this arrangement may not adequately prevent pooling of water on the top of the cover.

One problem with traditional boat covers are notoriously difficult to attach in a way that prevents water accumulation. Even small localized low points can begin to collect water and can create a point at which the fabric of the cover begins to sag under the weight of the water. This may increase the rate of water accumulation and may quickly compromise the ability of the cover to effectively cover the boat.

Accordingly, there remains a need for improved boat covers and, in particular, boat covers that are better able to shed water and avoid water accumulation.

SUMMARY OF THE INVENTION

An improved boat cover is disclosed having a strap configuration in which the straps are attached to and support the fabric of the cover on the bottom side of the fabric (that is, when the cover is attached to the boat, the side of the fabric facing the interior of the boat). When the straps are tightened down, the straps may create an internal rib structure, or an endoskeleton, beneath the fabric to help form a downwardly concave or at least substantially planar upper fabric surface that readily sheds any precipitation and prevents water accumulation at low points in the fabric.

According to one aspect of the invention, a boat cover for a boat is disclosed. The boat cover may have a fabric having a top side that is adapted to shed precipitation and a bottom side that, when the boat cover is applied to the boat, is downwardly concave and faces an interior portion of the boat. The boat cover may also include one or more longitudinal straps and one or more lateral straps that support the fabric on the bottom side of the fabric. These one or more longitudinal straps may extend between a bow edge and a stern edge of the boat cover and the one or more lateral straps may extend between a port edge and a starboard edge of the boat cover. The straps may be attached to the bottom side of the fabric, may be adjustable in length, and may support the fabric such that, when the boat cover is attached to the boat and the straps are tightened or secured in an attached state, the straps establish a rib structure beneath fabric of the boat cover to pull and hold the boat cover taut and to retain the desired shape of the boat cover.

In some embodiments, the boat cover may further include a strap sleeve extending along a portion of a periphery of the bow edge of the boat cover. The strap sleeve may have a channel running through it that may receive one of the longitudinal straps. It is contemplated that there may be only a single longitudinal strap and that the strap sleeve at the bow end may receive this single longitudinal strap, such that a middle portion of the longitudinal strap is retained within the strap sleeve, and after leaving the strap sleeve, the two ends of the strap extend back towards the stern end of the boat cover. In this case, the boat cover may also include two longitudinal strap channels formed proximate the stern edge of the boat cover through which the two ends of the single longitudinal strap are received. These two longitudinal strap channels at the stern edge of the boat cover may be sewn into the fabric and/or may be laterally spaced to accommodate a motor at the stern end of the boat and beneath the boat cover.

In some forms, which may be combined with the other forms described above, the boat cover may further include a plurality of lateral channels sewn into the fabric between the port edge and the starboard edge of the boat cover on the bottom side of the fabric. Each of these lateral channels may receive one of the lateral straps.

It is further contemplated that in addition to any sewn in channels, there may be one or more web loops attached to the bottom side of the fabric. The longitudinal straps may be received in these web loops to help retain the bottom side of the fabric in close proximity to the respective strap by virtue of the web loop and guide the position of the straps. Moreover, at least some of these web loops may be placed in close proximity to points of intersection between the one or more lateral straps and the one or more longitudinal straps. By doing this, greater control can be had over the points of intersection of the straps which may help to establish and retain the rib structure.

The size and shape of the boat cover and the method of manufacture may result in the boat cover having certain structural qualities. When pulled taut, the fabric may have a three-dimensional form generally corresponding to the shape of the top of a boat, in which the cover is longer in the longitudinal direction than the lateral direction. Based on the shape of the average boat it is contemplated that in most situations, the cover may include a plurality of lateral straps. Further, it is contemplated that the fabric may include multiple sections of fabric joined together (e.g., by sewing, adhesive, or so forth) to help accommodate the complex three-dimensional form.

In order to establish the rib structure, the straps may be specifically arranged. For example, in some forms, the one or more longitudinal straps and the one or more lateral straps may cross over one another at least one location over the area of fabric. At these locations where the straps cross over one another, the lateral strap may be closer to the fabric than the intersecting longitudinal strap. Because the longitudinal strap likely extends over the windshield to form a peak along the strap at the top of the windshield, this thereby causes the lateral strap to wrap over the longitudinal strap when the respective straps are tightened. This causes the lateral strap to arch upward centrally over a lateral dimension of the boat cover, as it wraps over the one or more longitudinal straps, thereby tenting the supported fabric to improve shedding of precipitation.

DETAILED DESCRIPTION

Figure 1:
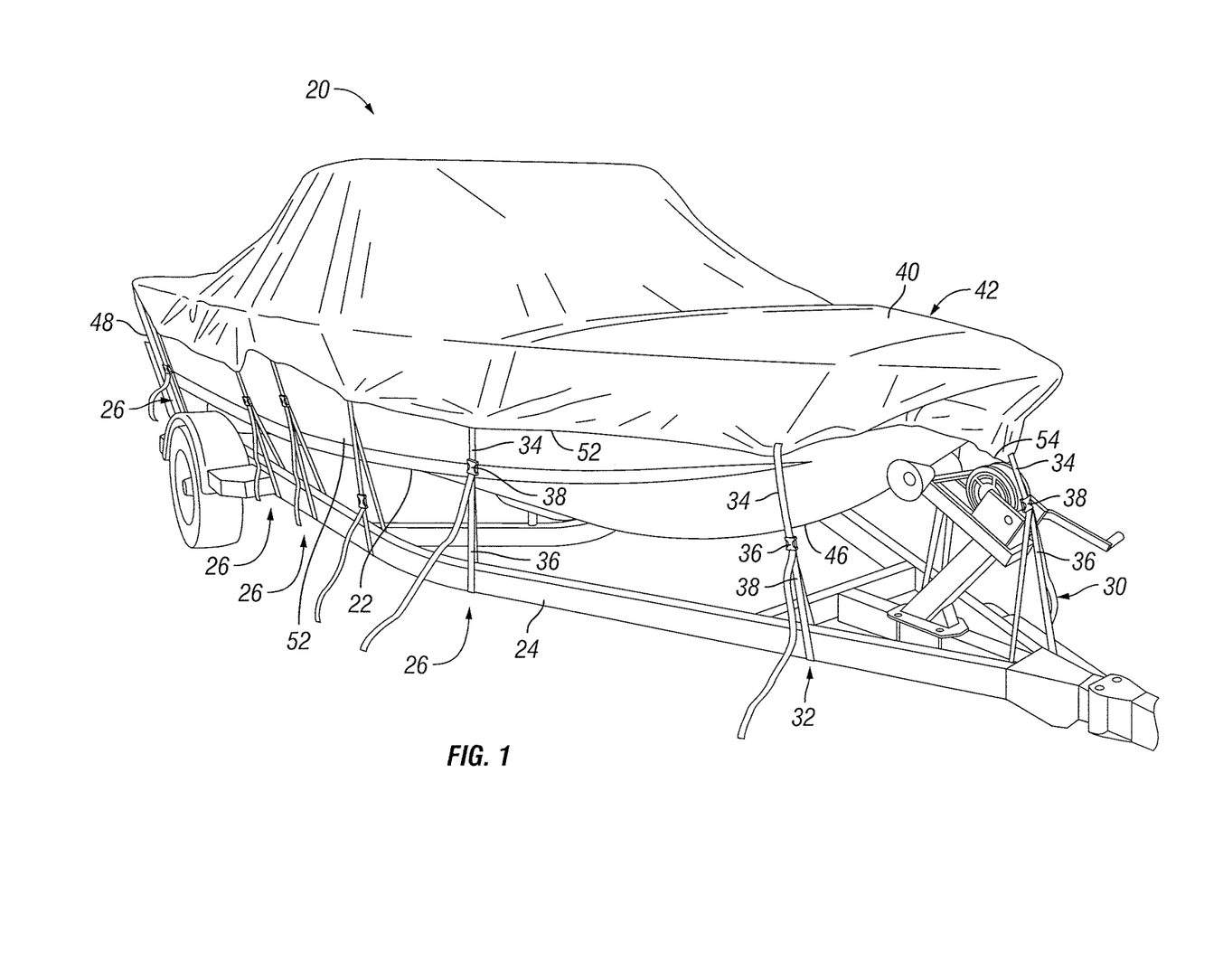
FIG. 1 is a front perspective view of a boat cover in an attached state coving a boat that is attached to a trailer.
Figure 2:
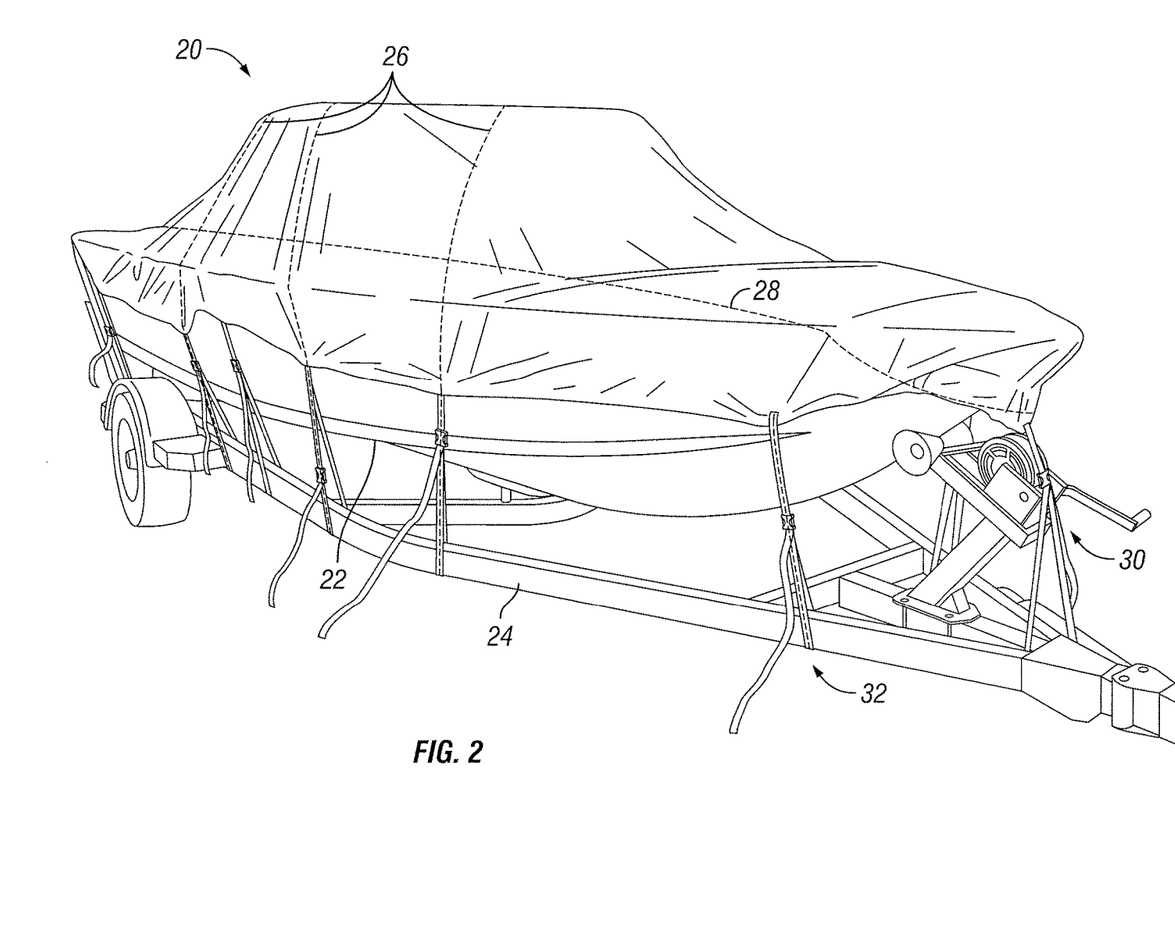
FIG. 2 is a front perspective view of the boat cover, boat, and trailer of FIG. 1, with dashed lines showing underlying lateral and longitudinal straps creating a semi-rigid rib structure.
Figure 3:
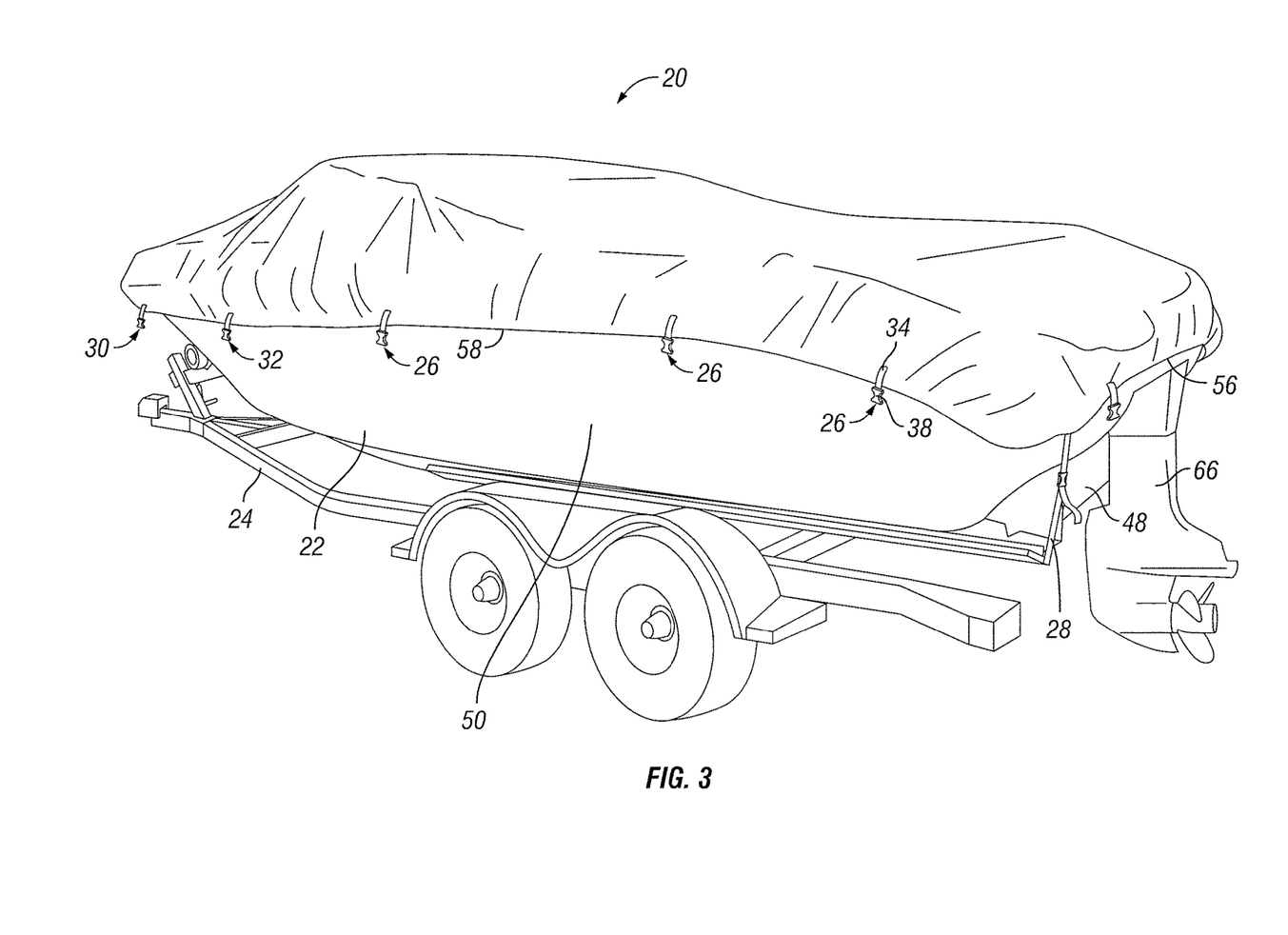
FIG. 3 is a rear perspective view of the boat cover, boat, and trailer of FIG. 1, with the boat cover detached from the trailer.

Referring first to FIGS. 1-3, a boat cover 20 is illustrated. This boat cover 20 may be removably attached to the top of a boat 22, which may be placed on a trailer 24 for towing. As shown, the boat 22 may be secured to the trailer 24 via various ties or straps 26, 28, 30, and 32, such as nylon straps. In the illustrated embodiment, the straps 26, 28, 30, and 32 may be multi-part, including a boat cover section 34 and a trailer section 36, where the boat cover section 34 may be retained against the boat cover 20 and the trailer section 36 may be secured to the trailer 24.

Each of these strap sections 34 and 36 may be attached to half of a deformable buckle snap 38 (i.e. one section 34 or 36 is attached to the female buckle portion and the other section 34 or 36 is attached to the male buckle portion). The deformable buckle snap 38 may be of the type that can pressed together to lock the buckle halves together and in which the deformable arms can be pinched to release the buckle snap parts from one another), to releasably connect the boat cover sections 34 and the trailer sections 36 together.

In FIGS. 1 and 2, the portions of the buckle snaps 38 are shown coupled to one another, to secure the boat cover 20 on top of the boat 22. However, in FIG. 3, the buckle snaps 38 are decoupled with the free ends of the strap section 34 of the boat cover 20 are shown dangling alongside the boat 22. When the strap sections 34 and 36 are coupled together, then the at least one of the strap sections 34 and/or 36 may have its overall length shortened to secure the boat cover 20 on to the boat 22 by tightening down the strap section 34 and/or 36. Conversely, the overall length of the strap section 34 and/or 36 may be lengthened to aid in removing the boat cover 20 from the boat 22. Tightening of the straps 26, 28, 30, and 32 may be performed by ratcheting mechanisms that may shorten the overall length of the strap 26, 28, 30, and 32 mechanically or with tension locks (such as, for example, those that have the strap 34 and/or 36 double back onto itself and include teeth to prevent the straps 26, 28, and 30 from sliding, as are common in backpack shoulder straps).

Notably, the straps 26 and 28 do not extend over the top side 40 of the boat cover 20, and may instead, support a fabric 42 of the boat cover 20 from the bottom side 44 of the boat cover 20. The fabric 42 may be a single piece of material, such as nylon, that sheds precipitation easily, or the fabric 42 may have a different material for the top side 40 and the bottom side 44. Alternatively the material of the fabric may be a non-precipitation shedding material that is coated in a precipitation shedding material.

The straps 26 and 28 may form a type of semi-rigid rib structure, or endoskeleton, under the fabric 42 as shown by the dashed lines in FIG. 2. This may help to keep the fabric 42 taut and raised above the top of the boat 22 to avoid the accumulation of precipitation, such as rain water, at low points along the top side 40 of the cover 42. By shedding precipitation efficiently, the accumulation of precipitation may be reduced, which may also reduce or prevent sagging of the fabric 42, which may lead to further, and accelerated, accumulation of precipitation and further sagging of the cover 20.

Figure 4:
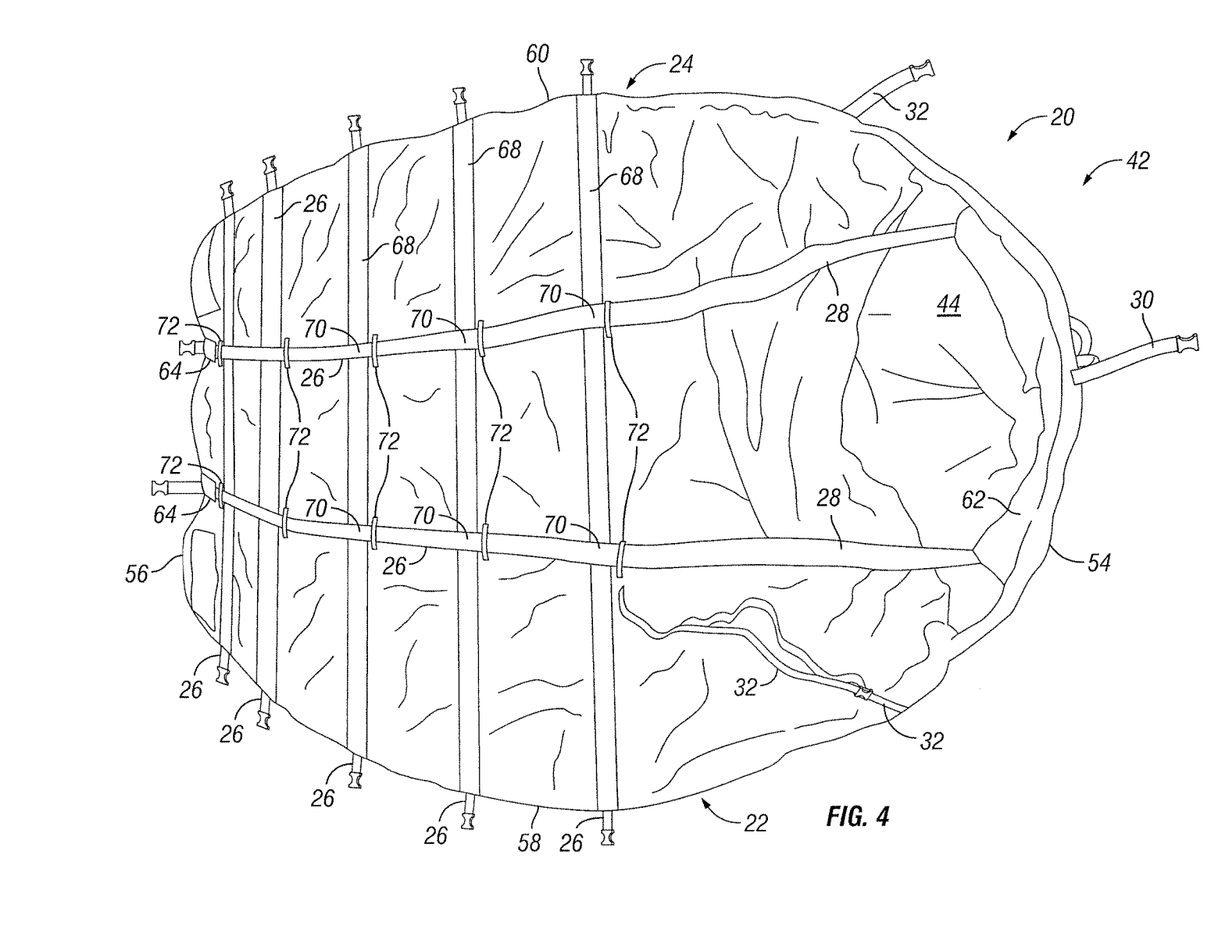
FIG. 4 is a bottom side view of the boat cover.

Referring to FIG. 4, which depicts bottom side view of the boat cover 20, the boat cover 20 may have a fabric 42, which is depicted as wrinkled because the boat cover 20 is laying in an unattached state and on a flat surface. However, as shown in FIGS. 1-2, the cover 20 as shown, may created a three dimensional shape that may follow a portion of the contours of the top of the boat 22 when the cover 20 is generally pulled taut in an attached state. In FIG. 4, a bottom side 44 of the fabric 42 of the boat cover 20 is shown, which is the side of the cover 20 that faces the interior of the boat 22 when the cover 20 is attached to the boat 22 in the attached state.

In the attached state, the boat cover 20 may extend longitudinally from a bow end 46 of the boat 22 to a stern end 48 and laterally from a port side 50 to a starboard side 52. The cover 20 may have a bow edge 54, a stern edge 56, a port edge 58, and a starboard edge 60, which may align with the bow end 46, stern end 45, port side 50, and the starboard side 52 respectively. As used herein, the term longitudinal refers to a direction that generally corresponds to a direction between the bow end 46 and the stern end 48 of the boat 22 and between the bow edge 54 and the stern edge 56 of the cover 20. The term lateral refers to a direction that generally corresponds to a direction between the port side 50 and the starboard side 52 and between the port edge 58 and the starboard edge 60. The longitudinal and lateral directions are generally perpendicular to one another and both the cover 20 and the boat 22 may have its own respective longitudinal and lateral directions that align when the cover 20 is attached to the boat 22.

Figure 5:
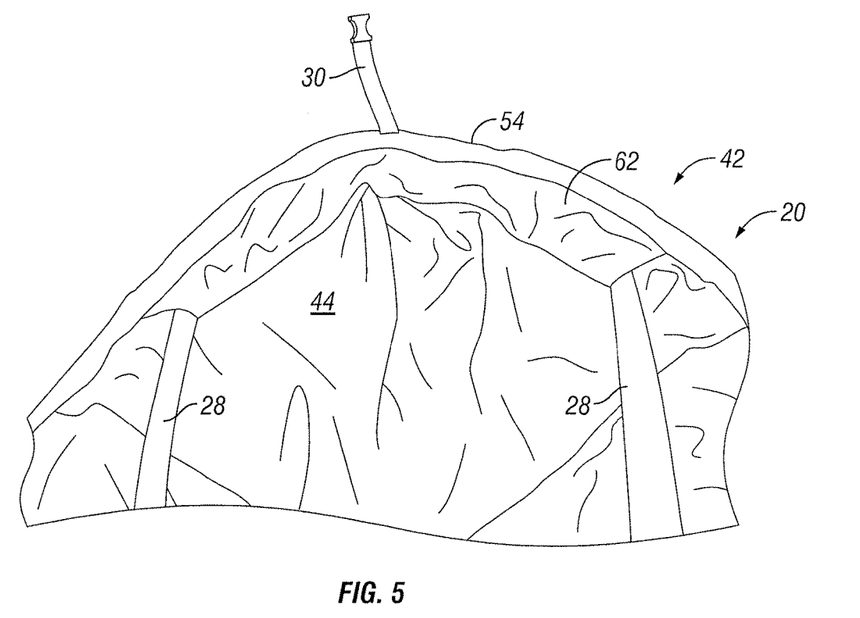
FIG. 5 is an enlarged partial view of the bow edge of the boat cover showing the strap sleeve and a longitudinal strap.
Figure 6:
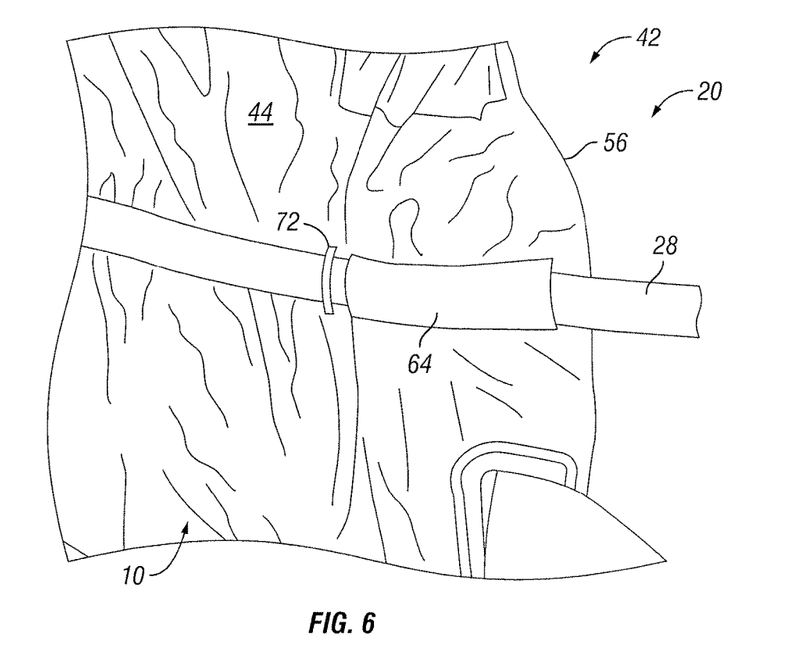
FIG. 6 is an enlarged partial view of the stern edge of the boat cover and one longitudinal channel receiving one end of a longitudinal strap.
Figure 7:
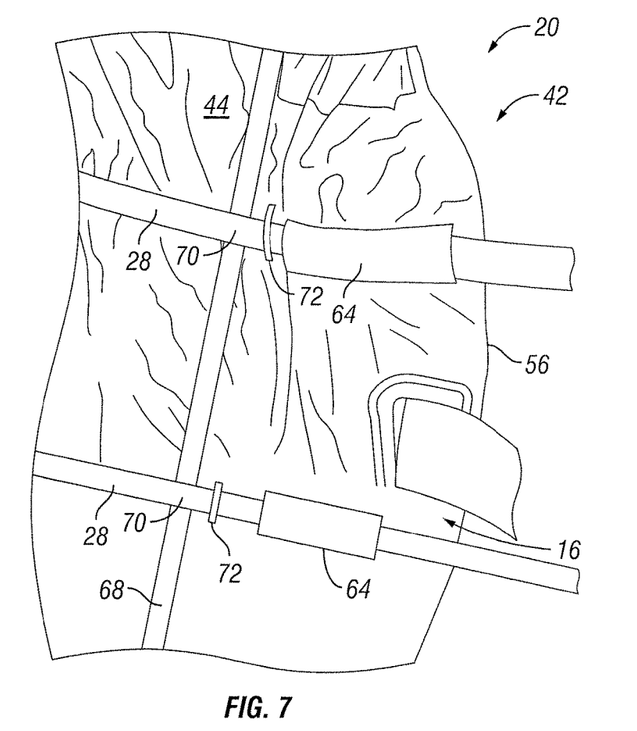
FIG. 7 is an enlarged partial view of the stern edge of the boat cover and two longitudinal channels receiving two ends of the longitudinal strap.

As can be seen in FIG. 4, there are two groups of straps 26 and 28 that are adjustably attached to the bottom side 44 of the fabric 42 to support the bottom side 44 of the fabric 42. One group may be one or more longitudinal straps 28 extending longitudinally from the bow edge 54 to the stern edge 56, and may extend beyond the bow edge 54 and the stern edge 56. In some embodiments there may be only a single longitudinal strap 28, with a middle portion of the longitudinal strap 28 routed through a channel in a strap sleeve 62 sewn onto a portion of the periphery of the fabric 42 toward the bow edge 54, as illustrated in FIG. 5. The two terminal ends of the longitudinal strap 28 may extend from the strap sleeve 62 towards the stern edge 56 of the boat cover 20 and each terminal end may extend through one of a pair of longitudinal channels 64, as are illustrated in FIGS. 6 and 7. These longitudinal channels 64 may be sewn onto the bottom side of the fabric 42. The longitudinal channels 64 may be spaced laterally from one another, such that the ends of the longitudinal strap 28 accommodate the placement of a motor 66 on the stern end 48 of the boat 22 underneath the boat cover 20, through longitudinal straps 28 straddling the motor 66 when the cover 20 is in an attached state.

Figure 8:
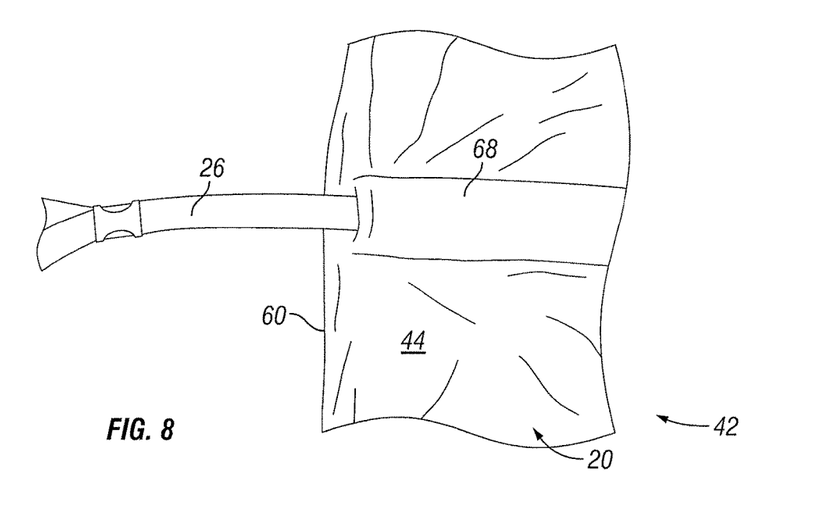
FIG. 8 is an enlarged partial view of a port or starboard edge of the boat cover and one of the lateral straps extending through a lateral sleeve.

A second group of straps 26, may be a plurality of lateral straps 26 extending in a lateral direction between the port edge 50 and the starboard edge 52. These straps 26 may be received in, and may run through, lateral channels 68, as shown in FIG. 8, sewn into the bottom side 44 of the fabric 42 that extend laterally between the port edge 50 to the starboard edge 52. The ends of the lateral straps 26 may extend between the port edge 50 and starboard edge 52 of the boat cover 20 for attachment to the sections of the straps sections secured to the trailer 14.

Figure 9:
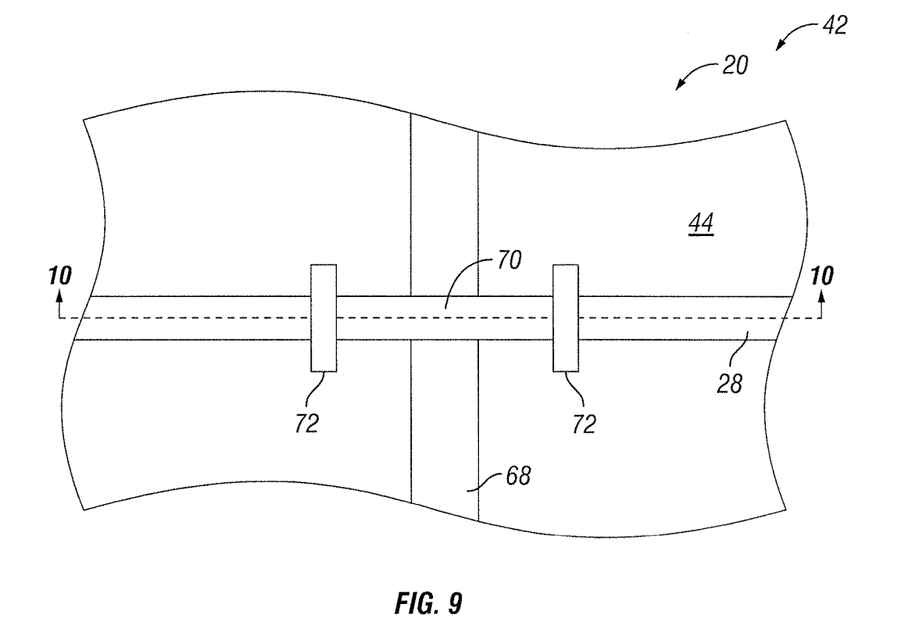
FIG. 9 is a bottom view of a point of intersection between a lateral strap and a longitudinal strap.
Figure 10:
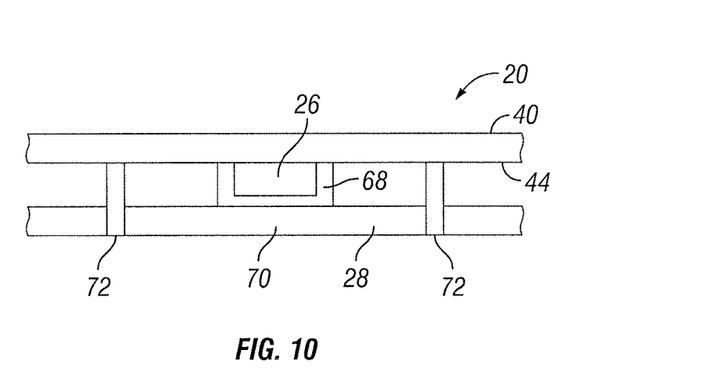
FIG. 10 is a cross sectional view of FIG. 9 taken along line 10-10 showing the point of intersection between a lateral strap and the longitudinal strap.

Referring to FIGS. 9 and 10, it is noted that the longitudinal strap 28 and the lateral straps 26 may intersect each other at a plurality of intersection points 70, even through the straps 26 and 28 may not come into direct contact with one another (i.e. there may be vertical separation between the lateral 26 and longitudinal 28 straps). The lateral straps 26 may be located vertically closer to the bottom side of the fabric 42 than the longitudinal strap 28. Thus, when the longitudinal strap 28 is tightened down first when the cover 20 is attached to the boat 22, the longitudinal strap 28 may extend over the high points of the boat 22, such as a windshield. By locating the lateral straps 26 between the fabric 42 and the longitudinal strap 28 at the points of intersection 70, the lateral straps 26 are forced to arch upward centrally over the lateral dimension when the lateral straps 26 are tightened down over the taut longitudinal strap 28. This may help to create the rib structure beneath the fabric 42 that gives the boat cover 20 a downwardly concave shape. This formed shape may help to shed precipitation when the cover 20 is tightened down in an attached state to the boat 22.

With reference to FIGS. 4, 6, 7, 9, and 10, it is noted that a plurality of web loops 72 may be attached to the bottom side 44 of the fabric 42 such that the longitudinal strap 28 may extend through the web loops 72 to direct and guide the longitudinal strap 28. Notably, in the form illustrated, the web loops 72 may be positioned close to the lateral channels 68 in order to control placement of the longitudinal strap 28 when it is in close proximity to one of the points of intersection 70 with one of the lateral straps 26.

The strap 30 may be a front strap 30, with the boat cover section 34 of strap 30 attached on its free end towards the bow edge of the cover 20, and may be attached to the top side 40 or bottom side 44 of the boat cover 20 or may be attached to the strap sleeve 62. The trailer section 36 of the strap 30 may be attached to the trailer 24. The front strap 30 may be used to secure the bow edge 54 portion of the cover 20 and to keep it taut against the boat 22 when the cover 20 is in an attached state.

The boat cover 20 may have two forward side straps 32. One strap 32 may be located toward the bow edge 54 and port edge 58 of the cover and the other strap 32 may be located toward the bow edge 43 and the starboard edge 60. The boat cover section 34 of the straps 32 may be attached to the top side 40 or bottom side 44 of the boat cover 20, while the trailer section 36 may be attached to the trailer 24. The forward side straps 32 may assist the front strap 30 in keeping the bow edge 54 portion of the cover 20 in the attached state and taut against the boat 22.

The cover 20 may be in an attached state when the cover 20 covers the boat 22, is attached to the trailer 24, and is pulled taut against the boat 22 to create the downwardly concave shape. The straps 26, 28, 30, and 32 may have their overall lengths shorted in the attached state to create tension in the straps 26, 28, 30, and 32 to pull the cover 22 taut against the boat 22. When the lateral 26 and longitudinal straps 28 are shorted to create tension, the straps 26 and 28 pull against the strap sleeve 62, longitudinal channels 64, lateral channels 68, and the web loops 72. This in turn may pull the fabric 40 downward toward the boat 22. As the fabric 40 is pulled downward, the fabric 40 creates the three dimensional shape, due to the semi-rigid rib structure created by the straps 26 and 28, that contours a portion of the top of the boat 22 and creates the downwardly concave shape to prevent accumulation of precipitation. The straps 30 and 32 aid in keeping the bow edge 54 portion of the cover 20 taut against the bow end 46 portion of the boat 22.

It will be appreciated that other various embodiments and configurations are contemplated by this disclosure and that the invention is not limited to this particular configuration. For example, while exposed or concealed straps are shown at various points over the bottom side of the cover 20, it is contemplated that modifications could be made in which the straps are still adjustably attached to the fabric 40. Further, as yet another example, it is contemplated that the fabric 40 can include multiple joined sections by sewing, adhesive, or so forth to achieve the desired three dimensional form for the cover. Still yet, there could be different numbers or orientations of straps used to attain a rib structure having a form different than that illustrated. Further, it is contemplated that the boat cover 20 might include structures or features in addition to those illustrated or described herein. For example, there may be a drawstring around the periphery of the cover that can be tightened to improve contact between the edge of the cover 20 and the boat 22. As another example, the cover 22 might be specially treated for waterproofing to help improve the ability of the fabric 40 to shed water or to reduce the permeability of the fabric 40 to water.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A boat cover for a boat, comprising:
   a fabric configured to be removably attached to a boat, the fabric having a top side, a bottom side, a bow edge, and a stern edge, the top side of the fabric being adapted to shed precipitation;
   at least one longitudinal strap attached to the bottom side of the fabric and extending between the bow edge and the stern edge of the fabric; and
   a ratcheting mechanism coupled to the at least one longitudinal strap, the ratcheting mechanism being configured to adjust a length of the at least one longitudinal strap, the at least one longitudinal strap being configured to support the fabric when the fabric is attached to the boat and the at least one longitudinal strap is under tension.

2. The boat cover of claim 1, wherein the at least one longitudinal strap is configured to establish an at least semi-rigid rib structure beneath the fabric when the fabric is attached to the boat to pull the fabric taut against the boat and to form a downwardly concave shape.

3. The boat cover of claim 1, including:
   at least one lateral strap supporting the bottom side of the fabric, the at least one lateral strap extending between a port edge and a starboard edge of the fabric; and
   wherein a portion of at least one of the at least one longitudinal strap and a portion of the at least one lateral strap are retained against a portion of the bottom side of the fabric.

4. The boat cover of claim 3, including a lateral channel sewn into the fabric configured to receive the at least one lateral strap.

5. The boat cover of claim 1, further comprising a strap sleeve extending along a portion of the bow edge of the fabric, the strap sleeve receiving at least a portion of the at least one longitudinal strap.

6. The boat cover of claim 1, including a plurality of web loops attached to the bottom side of the fabric, wherein the at least one longitudinal strap is received in the plurality of web loops to retain the bottom side of the fabric in close proximity to the at least one longitudinal strap.

7. The boat cover of claim 1, wherein the fabric comprises multiple sections of fabric joined together.

8. The boat cover of claim 1, wherein, when the fabric is attached to the boat, the fabric has a three-dimensional form generally corresponding to a portion of a contour of a top of the boat.

9. The boat cover of claim 1, including a drawstring connected to the fabric, the drawstring being configured to secure the fabric to the boat.

10. A boat cover, comprising:
    a fabric configured to shed precipitation;
    at least one longitudinal strap attached to the fabric and extending between a bow edge and a stern edge of the fabric; and
    a ratcheting mechanism coupled to the at least one longitudinal strap, the ratcheting mechanism being configured to adjust a length of the at least one longitudinal strap, the at least one longitudinal strap being configured to support the fabric when the at least one longitudinal strap is under tension.

11. The boat cover of claim 10, wherein the at least one longitudinal strap is configured to establish an at least semi-rigid rib structure beneath the fabric when the fabric is attached to a boat to pull the fabric taut against the boat and to form a downwardly concave shape.

12. The boat cover of claim 10, including:
    at least one lateral strap extending between a port edge and a starboard edge of the fabric; and
    wherein a portion of at least one of the at least one longitudinal strap and a portion of the at least one lateral strap are retained against a portion of a bottom side of the fabric.

13. The boat cover of claim 10, including a plurality of web loops attached to a bottom side of the fabric, wherein the at least one longitudinal strap is received in the plurality of web loops to retain the at least one longitudinal strap against the bottom side of the fabric.

14. The boat cover of claim 10, wherein, when the fabric is attached to a boat, the fabric has a three-dimensional form generally corresponding to a portion of a contour of a top of the boat.

15. The boat cover of claim 10, including a drawstring connected to the fabric, the drawstring being configured to secure the fabric to a boat.

16. A device, comprising:
    a fabric configured to shed precipitation;
    a strap attached to the fabric and extending between a first edge and a second edge of the fabric; and
    a ratcheting mechanism coupled to the strap, the ratcheting mechanism being configured to put the strap under tension when the fabric is attached to a boat, the strap being configured to support the fabric when the strap is under tension.

17. The device of claim 16, wherein, when the fabric is attached to a boat and the strap is under tension, the fabric has a three-dimensional form generally corresponding to a portion of a contour of a top of the boat.

* * * * *